US012679925B2

(12) United States Patent
Kondo et al.

(10) Patent No.: US 12,679,925 B2
(45) Date of Patent: Jul. 14, 2026

(54) RESIN COMPOSITION, RESIN CURED PRODUCT, AND FIBER REINFORCED RESIN

(71) Applicant: HITACHI, LTD., Tokyo (JP)

(72) Inventors: Takeshi Kondo, Tokyo (JP); Takahito Muraki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 540 days.

(21) Appl. No.: 18/033,094

(22) PCT Filed: Aug. 25, 2021

(86) PCT No.: PCT/JP2021/031113

§ 371 (c)(1),
(2) Date: Apr. 21, 2023

(87) PCT Pub. No.: WO2022/102203

PCT Pub. Date: May 19, 2022

(65) Prior Publication Data

US 2023/0391943 A1 Dec. 7, 2023

(30) Foreign Application Priority Data

Nov. 10, 2020 (JP) ................................ 2020-187091

(51) Int. Cl.

*C08G 59/68* (2006.01)
*C08G 59/24* (2006.01)
(Continued)

(52) U.S. Cl.

CPC ......... *C08G 59/685* (2013.01); *C08G 59/245* (2013.01); *C08G 59/42* (2013.01);
(Continued)

(58) Field of Classification Search

None
See application file for complete search history.

(56) References Cited

U.S. PATENT DOCUMENTS

| | | | |
|---|---|---|---|
| 4,113,791 | A | 9/1978 | Smith et al. |
| 2013/0300020 | A1 | 11/2013 | Leibler et al. |

FOREIGN PATENT DOCUMENTS

| | | | | | |
|---|---|---|---|---|---|
| CN | 108570215 | A | * | 9/2018 | ............. C08K 5/098 |
| CN | 110003648 | A | * | 7/2019 | .............. C08L 79/04 |

(Continued)

OTHER PUBLICATIONS https://www.calpaclab.com/manganese-acetylacetonate-min-97-100-grams/ala-m106182-100g?srsltid=AfmBOop85OehKv-JXXP62JKasujvwnk5atiqR3br_6oCdeQlcWUonkCZ (accessed Jan. 27, 2026) (Year: 2026).*

(Continued)

*Primary Examiner* — Ha S Nguyen

(74) *Attorney, Agent, or Firm* — MATTINGLY & MALUR, PC

(57) ABSTRACT

Provided are a resin composition, a resin cured product, and a fiber reinforced resin capable of shortening a stress relaxation time. In order to solve this problem, the resin composition contains an epoxy compound having two or more epoxy groups in a molecule, an acid anhydride, and a complex in which an organic ligand is coordinated to manganese (III). The resin cured product contains a resin having an ester group and a hydroxy group, and a complex in which an organic ligand is coordinated to manganese (III). A fiber reinforced resin 101 contains a resin 1 having an ester group and a hydroxy group, fibers 2 impregnated with at least the resin, and a complex 3 in which an organic ligand is coordinated to manganese (III).

10 Claims, 2 Drawing Sheets

(51) Int. Cl.
*C08G 59/42* (2006.01)
*C08G 59/50* (2006.01)
*C08J 5/04* (2006.01)
*C08L 63/00* (2006.01)
*C08L 63/04* (2006.01)

(52) U.S. Cl.
CPC .......... *C08G 59/5073* (2013.01); *C08J 5/042* (2013.01); *C08J 5/043* (2013.01); *C08J 5/046* (2013.01); *C08L 63/04* (2013.01)

(56) References Cited

FOREIGN PATENT DOCUMENTS

| | | | | |
|---|---|---|---|---|
| JP | 53-115800 | A | | 10/1978 |
| JP | 54-46299 | A | | 4/1979 |
| JP | H10144539 | A | * | 5/1998 |
| JP | H10298267 | A | * | 11/1998 |
| JP | 11-21334 | A | | 1/1999 |
| JP | H1121334 | A | * | 1/1999 |
| JP | 2006321899 | A | * | 11/2006 |
| JP | 2014-503670 | A | | 2/2014 |

OTHER PUBLICATIONS

International Search Report of PCT/JP2021/031113 dated Nov. 2, 2021.

* cited by examiner

[FIG. 1]
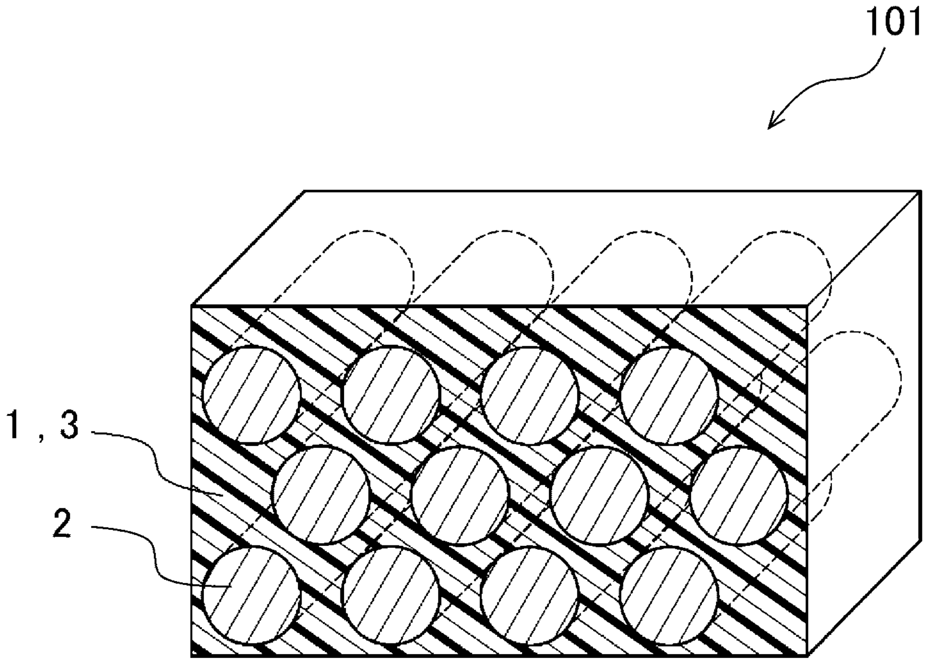

[FIG. 2]
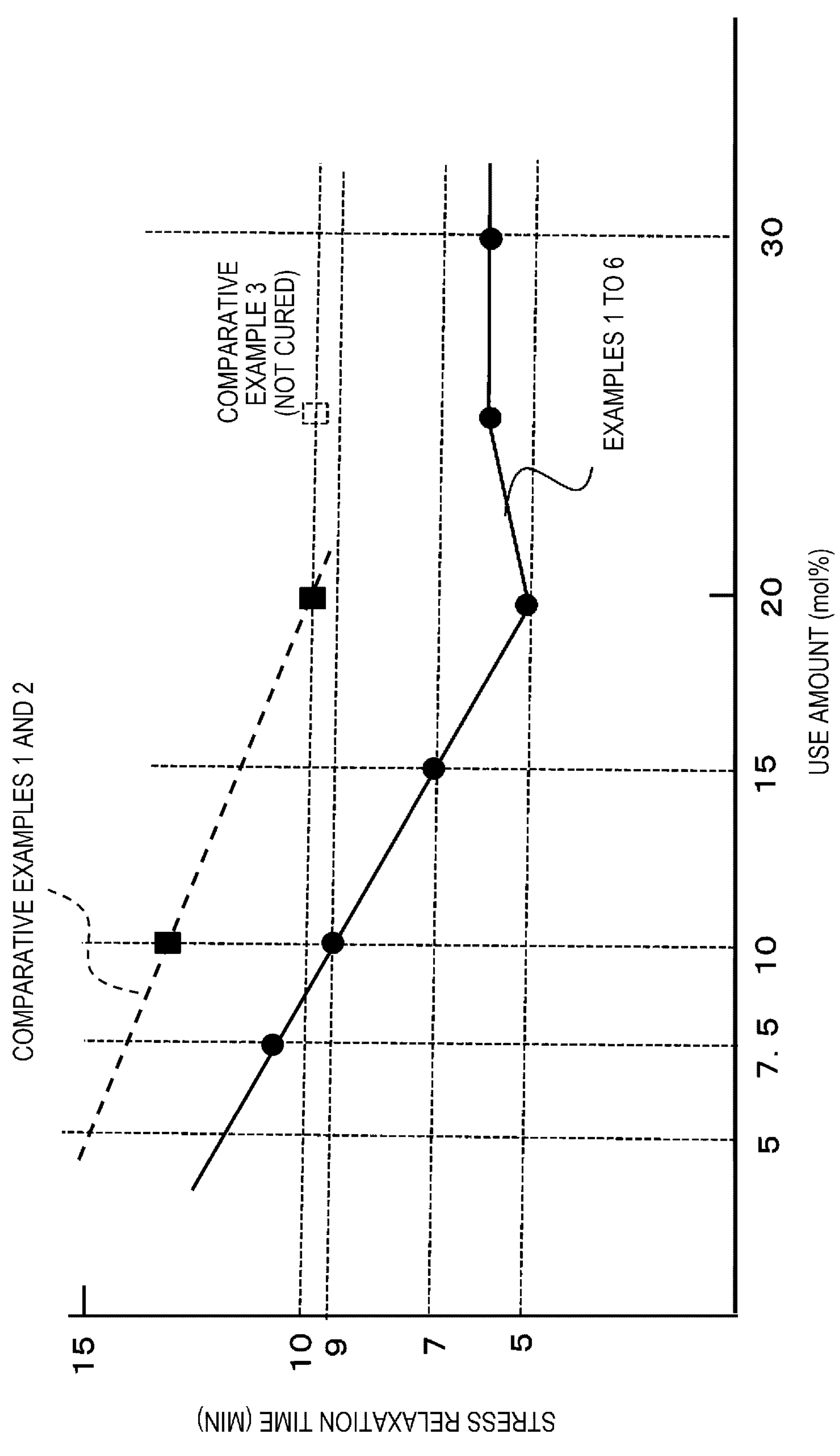

RESIN COMPOSITION, RESIN CURED PRODUCT, AND FIBER REINFORCED RESIN

TECHNICAL FIELD

The present disclosure relates to a resin composition, a resin cured product, and a fiber reinforced resin.

BACKGROUND ART

In recent years, there has been an increasing interest in a resin composition using a dynamic covalent bond. The dynamic covalent bond is a covalent bond, and is a covalent bond capable of being reversibly dissociated and bonded by an external stimulus such as heat or light. An attempt has been made to incorporate the bond into a resin network structure. In the case of a resin cured product obtained by curing the resin composition, the network structure is further changed due to the dynamic covalent bond, and therefore, when a stress such as strain is generated in the resin cured product, it is expected that the stress is relaxed and cracks are prevented.

When such a "dynamic" covalent bond is used, supermolecular formation and polymer construction which cannot be implemented so far can be achieved. Particularly, an attention is paid to a point that the involved bond is a covalent bond, so that the formed bond is remarkably stronger than weak bonds such as hydrogen bonds in supermolecules and polymers thereof in the related art, and the utilization can be an important method for constructing a novel structure. As a technique relating to a resin composition using a dynamic covalent bond, a technique described in PTL 1 has been known.

The technique in PTL 1 relates to a thermally deformable thermosetting resin and a thermosetting composite material containing the thermosetting resin. The composition is obtained by bringing at least one curing agent selected from acid anhydrides into contact with at least one thermosetting resin precursor in the presence of at least one transesterification catalyst. The thermosetting resin precursor contains a hydroxy group and/or an epoxy group, and optionally contains an ester group. The total molar amount of the transesterification catalyst is 5% to 25% of the total molar amount of the hydroxy group and the epoxy contained in the thermosetting precursor. The technique in PTL 1 further relates to a method for processing the above substances, a method for producing the above substances, and a method for recycling the above substances. The technique in PTL 1 further relates to a thermosetting resin used for carrying out the above method and a new solid form of a composition of the thermosetting resin.

CITATION LIST

Patent Literature

PTL 1: JP2014-503670A (in particular, Abstract)

SUMMARY OF INVENTION

Technical Problem

PTL 1 describes zinc acetylacetonate as a preferred transesterification catalyst (paragraph 0094). However, as will be described in detail later, in the case of using zinc acetylacetonate, a recombination rate of bonds is small, and therefore, the time in which a stress is relaxed (stress relaxation time) when the stress is applied becomes long.

An object of the present disclosure is to provide a resin composition, a resin cured product, and a fiber reinforced resin capable of shortening a stress relaxation time.

Solution to Problem

A resin composition according to the disclosure contains an epoxy compound having two or more epoxy groups in a molecule, an acid anhydride, and a complex in which an organic ligand is coordinated to manganese (III). Other solutions will be described later in embodiments for carrying out the invention.

According to the disclosure, a resin composition, a resin cured product, and a fiber reinforced resin capable of shortening a stress relaxation time can be provided.

BRIEF DESCRIPTION OF DRAWINGS

FIG. 1 is a schematic diagram of a fiber reinforced resin according to the disclosure.

FIG. 2 is a graph showing stress relaxation times in Examples 1 to 6 and Comparative Examples 1 and 2.

DESCRIPTION OF EMBODIMENTS

Hereinafter, modes for carrying out the disclosure (referred to as embodiments) will be described with reference to the drawings as appropriate. In the following description of one embodiment, another embodiment applicable to one embodiment will also be appropriately described. The present disclosure is not limited to the following one embodiment, and different embodiments can be combined with each other or freely modified within a range in which the effect of the disclosure is not remarkably impaired. In addition, the same members are denoted by the same reference numerals, and redundant description will be omitted. Further, members having the same functions are denoted by the same names. The contents shown in the drawings are merely schematic, and may be changed from an actual configuration to the extent that the effect of the disclosure is not remarkably impaired for convenience of illustration.

First, a relation among a resin composition, a resin cured product, and a fiber reinforced resin according to the disclosure will be described. Hereinafter, unless otherwise specified, when simply referred to as the "resin composition", the "resin cured product", and the "fiber reinforced resin", all of them refer to the "resin composition according to the disclosure", the "resin cured product according to the disclosure", and the "fiber reinforced resin according to the disclosure".

The resin composition is converted into a resin cured product by curing, and as will be described in detail later, a resin cured product having an ester group and a hydroxy group is obtained by a reaction between an epoxy compound and an acid anhydride contained in the resin composition. At this time, based on the amount of substance of the epoxy group, for example, the epoxy compound and the acid anhydride are used in a use amount at which the amount of the acid anhydride is less than the stoichiometric ratio. The acid anhydride generally functions as a curing agent, so that the reaction is a curing reaction and generally proceeds by heating. The fiber reinforced resin is obtained by reinforcing a resin cured product with fibers, and the description of the resin cured product can be similarly applied except that the fibers are contained.

The resin cured product and the fiber reinforced resin both have an ester group and a hydroxy group, which will be described in detail later, and for example, in a case where strain is generated by stress application, a transesterification reaction represented by the following formula (1) occurs. The structural formula shown in the formula (1) is an example of the structure obtained by the transesterification reaction, and R, R', and R" each represent any chemical structure. In each of the left side and the right side, a structure of the first item and a structure of the second item may be present in the same molecule or may be present in different molecules.

[Chem. 1]

(FORMULA 1)

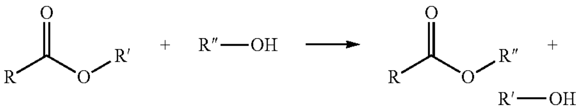

The reaction in the formula (1) proceeds in the presence of a complex according to the disclosure that generally functions as a catalyst by an external stimulus such as heating, and recombination of ester bonds occurs. A covalent bond at which such recombination is generated is referred to as a dynamic covalent bond. By using the following materials as the ester bond, the hydroxy group, and the complex according to the disclosure and appropriately adjusting the use amount, the transesterification reaction can proceed at a high speed and a stress relaxation time can be shortened even in the resin cured product after curing.

The stress relaxation time in the disclosure is defined as a time during which, based on a stress (initial stress) applied to a test piece formed of a resin cured product containing a resin and a complex, a stress remaining in the test piece decreases to 30% of the applied stress. Recombination of the ester bonds (reaction in the formula (1)) proceeds so as to relax the stress due to the stress application, and accordingly, the stress is further reduced (that is, acclimatized). Therefore, in order to evaluate a stress relaxation effect, the stress relaxation time is used as an index. A specific method of measuring the stress relaxation time will be described later in Examples.

The resin composition according to the disclosure contains an epoxy compound having two or more epoxy groups in a molecule, an acid anhydride, and a complex in which an organic ligand is coordinated to manganese (III). Among them, when the epoxy groups in the epoxy compound react with the acid anhydride by, for example, heating, an ester group and a hydroxy group are generated in the resin cured product. It is preferable that the resin composition has fluidity and is specifically, for example, a liquid, and the epoxy compound, the acid anhydride, and the complex are compatible and uniform. The resin composition may contain a solvent as necessary.

Examples of the epoxy compound include bisphenol A resins, novolac resins, alicyclic resins, and glycidyl amine resins. Specific examples thereof include, but are not limited to, at least one of bisphenol A diglycidyl ether phenol, bisphenol F diglycidyl ether, bisphenol S diglycidyl ether, resorcinol diglycidyl ether, hexahydrobisphenol A diglycidyl ether, polypropylene glycol diglycidyl ether, neopentyl glycol diglycidyl ether, diglycidyl phthalate ester, dimer acid diglycidyl ester, triglycidyl isocyanurate, tetraglycidyl diaminodiphenylmethane, tetraglycidyl metaxylenediamine, cresol novolac polyglycidyl ether, tetrabromobisphenol A diglycidyl ether, and bisphenol hexafluoroacetone diglycidyl ether.

Among them, the epoxy compound is preferably bisphenol A diglycidyl ether or novolac resins.

Examples of the acid anhydride include, but are not limited to, at least one of phthalic anhydride, tetrahydrophthalic anhydride, hexahydrophthalic anhydride, methyl tetrahydrophthalic anhydride, 3-dodecenyl succinic anhydride, octenyl succinic anhydride, methyl hexahydrophthalic anhydride, methyl nadic anhydride, dodecyl succinic anhydride, chlorendic anhydride, pyromellitic anhydride, benzophenone tetracarboxylic anhydride, ethylene glycol bis(anhydrotrimate), methylcyclohexenetetracarboxylic anhydride, trimellitic anhydride, polyazelaic anhydride, and derivatives thereof.

Among them, the acid anhydride preferably contains at least one of phthalic anhydride, tetrahydrophthalic anhydride, hexahydrophthalic anhydride, and derivatives thereof.

As described above, when the resin composition is cured, the epoxy compound and the acid anhydride are preferably used in a use amount at which the amount of the acid anhydride is less than the stoichiometric ratio based on the amount of substance of the epoxy group. In this way, since the amount of the acid anhydride is insufficient during the reaction between the epoxy group and the acid anhydride, the epoxy group reacts with, for example, moisture in the air to generate a hydroxy group.

A content of the acid anhydride in the resin composition is, for example, 30 mol % or more, and preferably 40 mol % or more, and the upper limit thereof is, for example, 70 mol %, and preferably 60 mol %, relative to the epoxy group. A hydroxy group can be generated after polymerization by setting the amount of the acid anhydride to the amount described above, and therefore the reorganization of the polymer structure by the dynamic covalent bond can be efficiently performed. In particular, when the content of the acid anhydride is 30 mol % or more, curing can sufficiently proceed. When the content of the acid anhydride is 70 mol % or less, the amount of hydroxy groups generated can be increased, and the transesterification reaction can easily proceed.

The complex according to the disclosure generally catalyzes the transesterification reaction represented by the formula (1), and is, for example, an organometallic complex in which an organic ligand is coordinated to manganese (III) as described above. The organic ligand is a ligand containing carbon and is bonded to manganese (III) in a manner of surrounding manganese (III). The complex according to the disclosure has higher solubility in an epoxy compound and an acid anhydride and higher catalytic activity than other catalysts that promote a transesterification reaction.

For example, as a result of studies conducted by the present inventor, a same complex except that manganese (II) is used instead of manganese (III) is lower in solubility and catalytic activity than the complex according to the disclosure containing manganese (III). It is considered that this is because the solubility can be improved by increasing the number of the organic ligands contributing to the solubility by containing manganese (III) which is a trivalent metal. Further, manganese (III) is coordinated to the oxygen atom in the ester group to show catalytic activity, and manganese (III) having a strong coordination force can further improve the catalytic activity. Accordingly, it is considered that these actions and effects are not exhibited and an effect of shortening the stress relaxation time cannot be obtained in the case of a complex containing a divalent metal and a complex containing a trivalent metal other than manganese (III). Therefore, the complex according to the disclosure can be added in an amount larger than that of other catalysts at the same addition amount as that of other catalysts. Further, the reaction rate of transesterification can be improved, and therefore, the stress relaxation time can be further shortened by increasing the speed of stress relaxation.

The complex according to the disclosure is preferably dispersed uniformly in at least one or both of the epoxy compound and the acid anhydride contained in the resin composition. Specific examples thereof include, but are not limited to, at least one of manganese (III) acetylacetonate, manganese (III) naphthenate, manganese (III) isopropoxide, manganese (III) acetate, manganese (III) di(2-ethylhexanoate), and manganese (III) naphthanate.

Among them, the complex preferably contains at least one of manganese (III) acetylacetonate, manganese (III) acetate, and manganese (III) naphthanate from the viewpoint of high versatility and easy availability.

A content of the complex according to the disclosure is not particularly limited, and is, for example, 5 mol % or more, preferably 10 mol % or more, and more preferably 15 mol % or more, and the upper limit thereof is, for example, 30 mol %, and more preferably 25 mol %, relative to the epoxy group. When the content of the complex is 5 mol % or more, the catalytic effect exhibited by the complex can be increased. Among them, when the content of the complex is 10 mol % or more, the use amount of the complex can be increased, and the stress relaxation time can be further shortened. Further, when the content of the complex is 15 mol % or more, the use amount of the complex can be particularly increased, and the stress relaxation time can be particularly shortened. When the content of the complex is 30 mol % or less, the complex can be sufficiently dissolved in at least one of the epoxy compound and the acid anhydride contained in the resin composition, and a uniform resin composition can be easily obtained.

In addition to the epoxy compound, the acid anhydride, and the complex, the resin composition may contain additives such as a curing accelerator, a flame retardant, an antioxidant, a light stabilizer, a dispersant, a lubricant, a plasticizer, an antistatic agent, a pigment, and a dye as necessary. The resin composition may contain an inorganic filler. Examples of the inorganic filler include powders of fused silica, crystalline silica, alumina, zircon, calcium silicate, calcium carbonate, potassium titanate, silicon carbide, aluminum nitride, boron nitride, beryllia, zircon, forsterite, stealite, spinel, mullite, titania, or the like, beads obtained by spheroidizing the powders, and glass fibers. In addition, the shape of the inorganic filler is not limited, and any shape such as a spherical shape and a scale-like shape may be used.

The resin cured product according to the disclosure is obtained by, for example, curing a resin composition, and contains, for example, a resin having an ester group and a hydroxy group generated by a reaction between an epoxy group and an acid anhydride. The ester group and the hydroxy group may be those already present before the reaction between the epoxy group and the acid anhydride. The resin cured product also contains, for example, the complex in which an organic ligand is coordinated to manganese (III) because the complex contained in the resin composition remains. The complex is generally dispersed in the resin cured product.

The above stress relaxation time in a case where a stress is applied to a test piece formed of the resin cured product (that is, a test piece containing the resin and the complex) is, for example, 11 min or shorter. Among them, the stress relaxation time is preferably 9 min or shorter. When the stress relaxation time is 9 min or shorter, the stress relaxation time can be particularly shorter than that of a resin cured product in the related art.

The resin cured product can be used for various coating materials, mold resins for transformers, mold sealing materials, and motor coils. In a case of being used as a coating material for a mobile object such as a car or a train, a damage can be repaired by appropriate heating. A transesterification reaction occurs in the damaged part by heating, and recombination of a bonding portion cleaved once is enabled, and the damage is repaired. The same may be applied to a coating material for building materials.

In the mold resin materials for transformers, cracks are generated due to strain caused by a difference in an expansion coefficient from other members during molding. However, when a crosslinking density of the resin is decreased in order to improve crack resistance, heat resistance is decreased. When an additive such as rubber particles or a filler is used, a viscosity of the resin is increased, voids are likely to be generated during mold casting, and thus, cracks starting from the voids occur, or an electrical insulation property is decreased. However, the resin cured product according to the disclosure can overcome these problems. Further, if the cracks are small, the cracks generating after use can also be repaired by heating.

The mold sealing material has a problem in crack resistance due to a difference in an expansion coefficient from other members such as a metal. As a method of improving the crack resistance of the resin for a mold sealing material, a decrease in a crosslinking density of the resin, a decrease in a toughness value due to additives such as rubber particles and fillers, and the like are performed. However, in this method, the generation of a crack in response to the strain generated during the use of the product cannot be prevented after the molding process is once performed. Therefore, in the resin cured product according to the disclosure, stress relaxation of the bond recombination in the transesterification reaction is generated due to heat generated during use of the product, and strain occurring between the resin cured product and other members after molding is reduced, and the crack generation can be prevented.

Further, the motor coil has a problem in crack generation due to electromagnetic vibration or the like. However, in the resin cured product according to the disclosure, the heat generated during the use of the motor causes recombination of bonds, and thus strain causing cracks, that is, a stress can be relaxed.

When the resin cured product according to the disclosure is applied to these products, the stress can be relaxed at a high speed as compared with a resin cured product in the related art using the same reaction, and thus crack resistance and repair properties can be improved.

FIG. 1 is a schematic diagram of a fiber reinforced resin 101 according to the disclosure. The fiber reinforced resin 101 contains a resin 1 having an ester group and a hydroxy group, fibers 2 impregnated with at least the resin 1, and a complex 3 in which an organic ligand is coordinated to manganese (III). The resin 1 has the same meaning as the resin described in the resin cured product according to the disclosure, and the complex 3 is dispersed in the resin 1. Accordingly, the fibers 2 are impregnated with the resin 1 in which the complex 3 is dispersed.

Examples of the fibers 2 include inorganic fibers and organic fibers. Examples of the inorganic fibers include glass fibers, asbestos fiber, carbon fibers, silica fibers, silica-alumina fibers, alumina fibers, zirconia fibers, potassium titanate fibers, Tyranno Fibers, silicon carbide fibers, and metal fibers. Examples of the organic fibers include high-strength polyethylene fibers, polyacetal fibers, aliphatic or aromatic polyamide fibers, polyacrylate fibers, fluorine fibers, boron fibers, polyacrylonitrile fibers, aramid fibers, and poly-p-phenylenebenzobisoxazole (PBO) fibers. One of these fibers may be used alone, or two or more kinds thereof may be used in combination.

Among them, the fibers 2 preferably contain at least one of aramid fibers, glass fibers, and organic fibers (for example, carbon fibers among them). By containing at least one of them, the mechanical strength of the fiber reinforced resin 10 can be improved. The carbon fibers can be classified, according to raw materials thereof, into a carbon fiber derived from a synthetic polymer (a polyacrylonitrile-based carbon fiber, a polyvinyl alcohol-based carbon fiber, a rayon-based carbon fiber, or the like) and a carbon fiber derived from a mineral (a pitch-based carbon fiber or the like). Among them, the carbon fiber derived from a synthetic polymer is preferred from the viewpoint of mechanical strength.

The fibers 2 are used in a form such as continuous fibers, long fibers, short fibers, and chopped forms, and a form such as unidirectional materials, plain weaves, and nonwoven fabrics. In addition, the fibers 2 may be directly added to the resin 1 for use, and the fibers 2 in the present embodiment are not limited to these fiber forms and fiber states.

In the fiber reinforced resin 101, a transesterification reaction that enables reversible dissociation occurs in the resin 1. As a result, the stress generated during curing and use is relaxed, and cracks and peeling are prevented. In addition, in the fiber reinforced resin 101, a transesterification reaction proceeds by applying an external stimulus such as an increase in temperature, so that secondary processing, reprocessing, repair, and the like can be performed. For example, the fiber reinforced resin 101 can be molded into a mold shape by pressing the fiber reinforced resin 101 while applying heat using a hot press machine. The speed of stress relaxation is higher in the fiber reinforced resin 101 than that in the related art, and therefore, a shape that cannot be molded in the related art can be molded or the shape can be molded at a high speed.

The fiber reinforced resin 101 can be used for components and main bodies used in various fields, such as railway vehicles, ships, aircrafts, unit buses, purification tanks, printed circuit boards, playground equipment, and ski plates, in addition to vehicle components.

EXAMPLES

Hereinafter, the disclosure will be described more specifically with reference to Examples, but the disclosure is not limited to the following Examples.

Example 1

The following materials were prepared.

Epoxy compound having two or more epoxy groups in molecule:

bisphenol A diglycidyl ether (jER828 epoxy resin manufactured by Mitsubishi Chemical Corporation)

Acid anhydride:

methyl-3,6-endomethylene-1,2,3,6-tetrahydrophthalic anhydride (derivative of tetrahydrophthalic anhydride, MHAC-P curing agent manufactured by Showa Denko Materials (Hitachi Chemical Co., Ltd. before changing the name))

Complex in which organic ligand is coordinated to manganese (III):

manganese (III) acetylacetonate (manufactured by Tokyo Chemical Industry)

Curing accelerator:

imidazole-based epoxy resin curing agent (2E4MZ-CN manufactured by Shikoku Chemicals Corporation)

To 100 parts by mass of the epoxy compound, 47 parts by mass (50 mol % relative to an epoxy group) of the acid anhydride, 19 parts by mass (10 mol % relative to the epoxy group) of the complex, and 0.3 parts by mass of the curing accelerator were added, and the mixture was stirred and mixed in the air to obtain a resin composition. In the resin composition, the epoxy compound, the acid anhydride, and the complex were compatible, and the resin composition was a sticky liquid. The obtained resin composition was cured by heating at 100° C. for 1 hour and at 200° C. for 1 hour to obtain a resin cured product.

The stress relaxation time of the prepared resin cured product was evaluated by a tensile stress relaxation test using a thermomechanical analyzer. A test piece having a length of 10 mm, a width of 5 mm, and a thickness of 0.5 mm was prepared using the obtained resin cured product. Using a thermomechanical analyzer at a temperature of 220° C., the test piece was pulled to generate an elongation of 5%. The stress (initial stress) when the elongation was 5% was defined as 100%, and the time when the stress decreased to 30% was used as an index of a stress relaxation time. The measured stress relaxation time was 9 min.

Example 2

A stress relaxation time was measured in the same manner as in Example 1 except that the use amount of the complex was changed to 27 parts by mass (15 mol % relative to the epoxy group), and as a result, the stress relaxation time was 7 min.

Example 3

A stress relaxation time was measured in the same manner as in Example 1 except that the use amount of the complex was changed to 38 parts by mass (20 mol % relative to the epoxy group), and as a result, the stress relaxation time was 5 min.

Example 4

A stress relaxation time was measured in the same manner as in Example 1 except that the use amount of the complex was changed to 46 parts by mass (25 mol % relative to the epoxy group), and as a result, the stress relaxation time was 6 min.

Example 5

A stress relaxation time was measured in the same manner as in Example 1 except that the use amount of the complex was changed to 57 parts by mass (30 mol % relative to the epoxy group), and as a result, the stress relaxation time was 6 min.

Example 6

A stress relaxation time was measured in the same manner as in Example 1 except that the use amount of the complex was changed to 14 parts by mass (7.5 mol % relative to the epoxy group), and as a result, the stress relaxation time was 11 min.

Comparative Example 1

A stress relaxation time was measured in the same manner as in Example 1 except that the use amount and the kind of the complex were changed to 14 parts by mass of zinc (II) acetylacetonate (manufactured by Tokyo Chemical Industry) (here, the use amount relative to the epoxy group was the same as that of Example 1), and as a result, the stress relaxation time was 13 min.

Comparative Example 2

A stress relaxation time was measured in the same manner as in Example 3 except that the use amount and the kind of the complex were changed to 28 parts by mass of zinc (II) acetylacetonate (manufactured by Tokyo Chemical Industry) (here, the use amount relative to the epoxy group was the same as that of Example 3), and as a result, the stress relaxation time was 10 min.

Comparative Example 3

A resin composition was prepared in the same manner as in Example 4 except that the use amount and the kind of the complex were changed to 35 parts by mass of zinc (II) acetylacetonate (manufactured by Tokyo Chemical Industry) (here, the use amount of the complex relative to the epoxy group was the same as in Example 4). During the preparation, the complex was not dissolved or dispersed in the resin composition. In addition, the prepared resin composition was not cured even when heated in the same manner as in Example 4, and a resin cured product was not obtained. Therefore, the stress relaxation time could not be measured.

<Consideration>

Table 1 shows stress relaxation times in Examples 1 to 6 and Comparative Examples 1 and 2. FIG. 2 is a graph showing the stress relaxation times in Examples 1 to 6 and Comparative Examples 1 and 2. For reference, Comparative Example 3 in which the stress relaxation time could not be measured is also shown. In FIG. 2, a solid line indicates the stress relaxation times in Examples 1 to 6, and a broken line indicates the stress relaxation times in Comparative Examples 1 and 2.

TABLE 1

| | Use amount (mol %) | | Stress |
|---|---|---|---|
| | Manganese (III) acetylacetonate | Zinc (II) acetylacetonate | relaxation time (min) |
| Example 1 | 10 | | 9 |
| Example 2 | 15 | | 7 |
| Example 3 | 20 | | 5 |
| Example 4 | 25 | | 5 |
| Example 5 | 30 | | 6 |
| Example 6 | 7.5 | | 11 |
| Comparative Example 1 | | 10 | 13 |
| Comparative Example 2 | | 20 | 10 |
| Comparative Example 3 | | 25 | Not cured |

As shown in FIG. 2, in Examples 1 to 6 in which the complex (transesterification catalyst) according to the disclosure was used, the stress relaxation time could be shortened as a whole as compared with Comparative Examples 1 and 2 in which a catalyst in the related art was used. For example, by setting the content of the complex to 5 mol % or more and 30 mol % or less relative to the epoxy group, the complex can be dissolved in the resin composition, and the stress relaxation time can be shortened. In addition, when Example 1 and Comparative Example 1 were compared in which the kinds of the complex were different but the use amounts were the same, i.e., 10 mol %, the stress relaxation time could be shortened by about 30% from 13 min to 9 min by using the complex according to the disclosure. When Example 3 and Comparative Example 2 were compared in which the kinds of the complex were different but the use amounts were the same, i.e., 20 mol %, the stress relaxation time could be halved from 10 min to 5 min by using the complex according to the disclosure.

In the case of Comparative Example 3, zinc (II) acetylacetonate is not dissolved, and thus, the upper limit of the use amount of zinc (II) acetylacetonate is considered to be about 20 mol %. The smaller the use amount is, the longer the stress relaxation time is. Therefore, it is presumed that the stress relaxation time in a case where zinc (II) acetylacetonate is used is about 10 min at the shortest.

On the other hand, by setting the content of the complex according to the disclosure to 10 mol % or more and 30 mol % or less relative to the epoxy group, the stress relaxation time could be reduced to 9 min or less (Example 1), which was shorter than about 10 min that was the smallest value of the stress relaxation time in the case of using the catalyst in the related art. Among them, by setting the content of the complex to 15 mol % or more and 30 mol % or less relative to the epoxy group, the stress relaxation time could be set to 5 min to 7 min and could be particularly shortened.

As described above, it was found that the stress relaxation time could be shortened by using a complex in which an organic ligand is coordinated to manganese (III), and in particular, the stress relaxation time could be halved at maximum by adjusting the use amount as compared with that of the related art. Accordingly, according to the disclosure, a resin composition, a resin cured product, and a fiber reinforced resin capable of shortening a stress relaxation time can be provided.

REFERENCE SIGNS LIST

1: resin

2: fiber

3: complex

101: fiber reinforced resin

The invention claimed is:

1. A resin composition comprising:

an epoxy compound having two or more epoxy groups in a molecule;

an acid anhydride including at least one of phthalic anhydride, tetrahydrophthalic anhydride, hexahydrophthalic anhydride, and derivatives thereof; and a complex in which an organic ligand is coordinated to manganese (III), the complex contains at least one of manganese (III) acetylacetonate, manganese (III) acetate, and manganese (III) naphthenate, wherein a content of the complex is 15 mol % or more and 30 mol % or less relative to the epoxy groups, and wherein a content of the acid anhydride is 40 mol % or more and 70 mol % or less relative to the epoxy groups.

2. The resin composition according to claim 1, wherein the epoxy compound is bisphenol A diglycidyl ether or an epoxy novolac resin.

3. A resin cured product comprising:

a resin having an ester group and a hydroxy group obtained by a reaction between an epoxy compound having two or more epoxy groups in a molecule and an acid anhydride including at least one of phthalic anhydride, tetrahydrophthalic anhydride, hexahydrophthalic anhydride, and derivatives thereof, wherein a content of the acid anhydride is 40 mol % or more and 70 mol % or less relative to the epoxy groups; and a complex in which an organic ligand is coordinated to manganese (III), wherein the complex contains at least one of manganese (III) acetylacetonate, manganese (III) acetate, and manganese (III) naphthenate, wherein a content of the complex is 15 mol % or more and 30 mol % or less relative to the hydroxy group.

4. The resin cured product according to claim 3, wherein when a time during which, based on a stress applied to a test piece containing the resin and the complex, a stress remaining in the test piece decreases to 30% of the applied stress is defined as a stress relaxation time, the stress relaxation time is 11 min or shorter.

5. The resin cured product according to claim 4, wherein the stress relaxation time is 9 min or shorter.

6. A fiber reinforced resin comprising:

a resin having an ester group and a hydroxy group obtained by a reaction between an epoxy compound having two or more epoxy groups in a molecule and an acid anhydride including at least one of phthalic anhydride, tetrahydrophthalic anhydride, hexahydrophthalic anhydride, and derivatives thereof, wherein a content of the acid anhydride is 40 mol % or more and 70 mol % or less relative to the epoxy groups;

a fiber impregnated with at least the resin; and a complex in which an organic ligand is coordinated to manganese (III), wherein the complex contains at least one of manganese (III) acetylacetonate, manganese (III) acetate, and manganese (III) naphthenate, wherein a content of the complex is 15 mol % or more and 30 mol % or less relative to the hydroxy group.

7. The fiber reinforced resin according to claim 6, wherein the fiber includes at least one of aramid fibers, glass fibers, and carbon fibers.

8. The resin composition according to claim 1, wherein a content of the complex is 25 mol % or more and 30 mol % or less relative to the epoxy groups.

9. The resin cured product according to claim 3, wherein a content of the complex is 25 mol % or more and 30 mol % or less relative to the epoxy groups.

10. The fiber reinforced resin according to claim 6, wherein a content of the complex is 25 mol % or more and 30 mol % or less relative to the epoxy groups.

* * * * *